B. W. PETSCHE.
PROCESS OF SEPARATING PULP FIBERS FROM PIGMENTS, SIZE, FILLING, AND OTHER IMPURITIES.
APPLICATION FILED MAY 7, 1909.
955,898.
Patented Apr. 26, 1910.
3 SHEETS—SHEET 1.
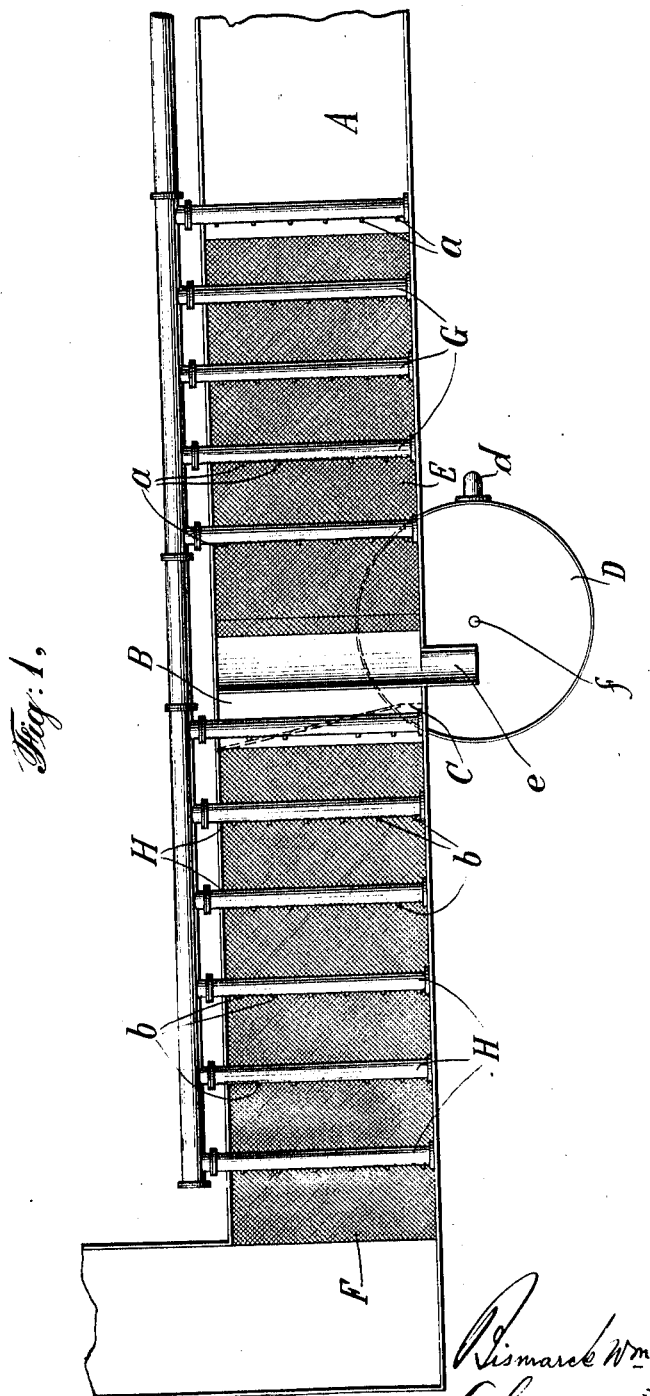

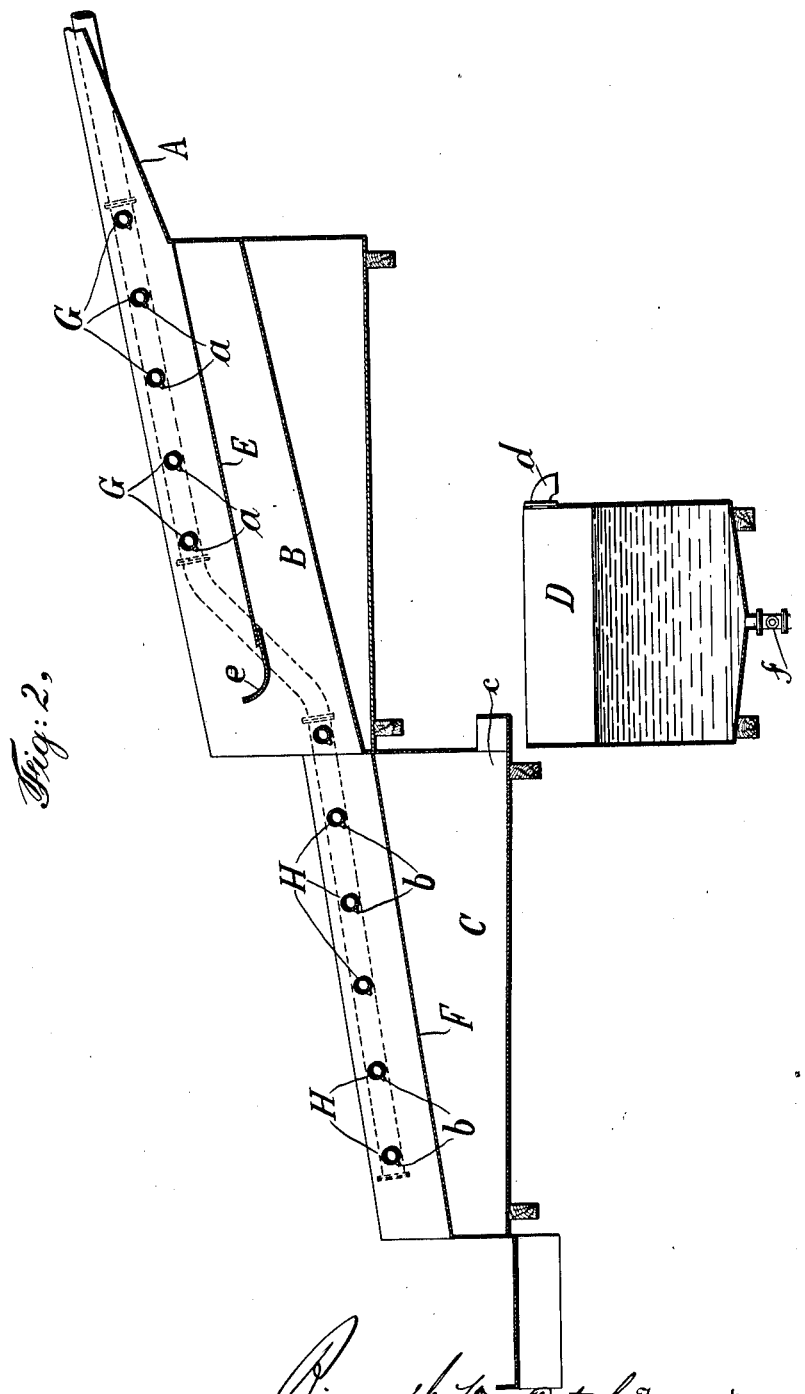

B. W. PETSCHE.
PROCESS OF SEPARATING PULP FIBERS FROM PIGMENTS, SIZE, FILLING, AND OTHER IMPURITIES.
APPLICATION FILED MAY 7, 1909.
955,898.
Patented Apr. 26, 1910.
3 SHEETS—SHEET 3.
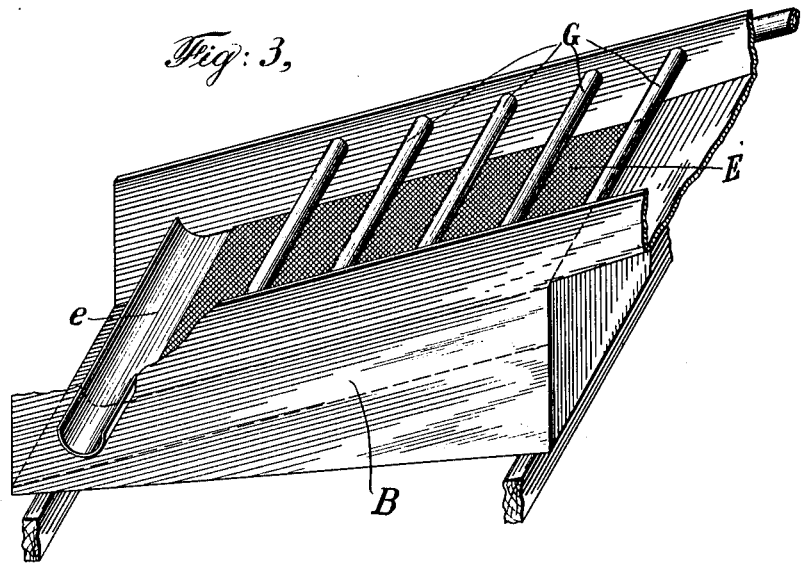
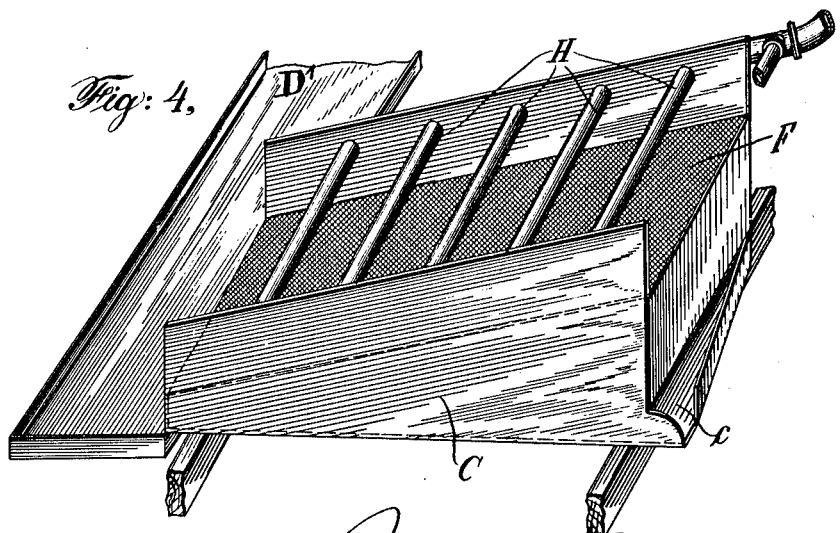

UNITED STATES PATENT OFFICE.

BISMARCK WILLIAM PETSCHE, OF YONKERS, NEW YORK.

PROCESS OF SEPARATING PULP FIBERS FROM PIGMENTS, SIZE, FILLING, AND OTHER IMPURITIES.

955,898. Specification of Letters Patent. Patented Apr. 26, 1910.

Application filed May 7, 1909. Serial No. 494,711.

*To all whom it may concern:*

Be it known that I, BISMARCK WILLIAM PETSCHE, a citizen of the United States, and a resident of Yonkers, county of Westchester, and State of New York, have invented certain new and useful Improvements in Processes for Separating Pulp Fibers from Pigments, Size, Filling, and other Impurities, whereof the following is a full, clear, and exact specification.

My invention relates to process and apparatus for recovering pulp from waste paper, such as newspapers, books and the like, and consists of the hereinafter described process and apparatus for separating the pulp fibers from the impurities, particularly printers' ink, size and the like, adhering to such fibers as the result of the previous use of such waste papers, from which the pulp fibers were recovered.

In carrying on my improved process, the waste paper is first disintegrated in the usual way in a beater engine, the pulped mass is then conveyed to a chest, where an alkaline solution is added thereto, and thoroughly mixed and agitated by a mechanical agitator, for a time sufficient to reduce the adhesive capacity of the oil of the ink and of such size and filler, as may not have been sufficiently softened or dissolved in the beating process, to the extent necessary for separating these impurities from the fibers of the pulp.

The alkaline solution may be prepared by dissolving one part of caustic soda in one thousand parts of water, measured by weight. Such solution will be found sufficient for dissolving the cohesity of the substances and also their adhesity to the fibers of pulp recovered from ordinary print papers, newspapers, books and the like, though some other papers, particularly such having printed thereon pictures, large size type, or some other particularly sized papers, might require a somewhat stronger alkaline solution. In this, however, care must be taken; it is preferable to use a weaker solution and work the material for a longer time in the chest, or to employ hot alkaline solution, which is more effective to solve or liquefy the dried ink, size, etc., than to use a stronger alkaline solution or other more intense solvents. Caustic soda is efficient for all papers, though other alkali may be used to prepare the solution. The alkaline solution may be used in the beaters in place of the water required for the beating process, it is, however, preferable to beat the stock in ordinary soft water and then soak and work it in the alkaline solution in the chest as explained. As a rule two hours soaking and agitating the pulped mass in the alkaline solution will be found more than sufficient to accomplish this result. The length of time, for which the pulped (disintegrated) material is to be kept agitated in the chest will depend upon the character of the material from which the pulp is to be recovered, whether hot or cold solution is used, and to some extent also upon the strength of the alkaline solution employed. It is best determined by taking a small sample of the mass, pressing out the solution and then shaking it in clear warm water in a glass. This test will show, whether the fibers of the pulp are freed from coagulated oil, the size, filler and other impurities.

Next the separating of the pulp fibers from the particles of ink pigments and the insoluble ingredients of the size is undertaken. This part most clearly distinguishes my improved process from other processes, having the same purpose, as heretofore were known or employed in the art. These processes proceeded upon the theory that these impurities may be removed by filtration or by floating them up and carrying them away by overflow—it being assumed that the specific gravity of the pulp fibers is greater than that of the carbon of the ink and other impurities, and consequently, that the former will settle on the bottom of the vessel, and the latter be carried away with the flow. Therefore, to my best knowledge and belief, no one has yet succeeded to recover really clean pulp and no one has yet succeeded to carry on any of the processes in a commercially economical way. In my improved process the pulp fibers are separated from the residue of the ink, size and filler by screening, the operation being performed by streams of water acting upon the pulped mass to pass it over the screens, the impurities being driven through the meshes and the purified fibers conveyed to a receptacle.

An apparatus suitable for carrying on this process is shown in the accompanying drawing, wherein—

Figure 1 is a plan view, and Fig. 2 a longitudinal sectional view of the apparatus. Fig. 3 a perspective view of the upper trough, the (coarse) screen and gutter; and Fig. 4 a similar view of the lower trough, the separating (finer) screen and of the series of sprinklers arranged in connection therewith.

The apparatus consists of the troughs A, B, C; tank D screens E and F and sprinklers G and H, arranged substantially as shown in the drawings. Instead of arranging each of the two screens E and F over one of the two adjoining troughs, they may be both located in one trough, one above the other. In such an arrangement the coarse (18 to 24 meshes to an inch) screen E would be on top and the fine (about 50 meshes to an inch) screen F underneath, the sprinklers G above the screen E, and the sprinklers H right underneath above the fine screen F. For such an arrangement the screen troughs would have to be made correspondingly deeper to accommodate both screens and sprinklers. It is, however, much more convenient to, and a more satisfactory result is obtained from, the working of the apparatus, if arranged as shown in the drawings.

The details of the construction of this apparatus and the actions of the several parts will be well understood from the following description of its use in the process: The pulped mass is discharged from the chest into the trough A, from where it flows or slides upon the coarse screen E and is propelled over it by the water discharged upon it an an angle of from 30 to 45° from the nozzles $a$ of the sprinklers G. Screen E is employed to exclude from the pulped mass such coarse parts of stock that might not have been sufficiently pulped, and whatever foreign coarse substances might have been contained in the stock. These coarse parts and impurities are driven into the gutter $e$ and flow into the tank D; whereas the finely pulped mass passes through the coarse screen E into the trough B, and is then conveyed, in a rather rapid flow, upon the screen F. The streams of water ejected upon this screen from the nozzles $b$ of sprinklers H at an angle of about 30 to 45° to its plane, propel and roll over the pulped material toward the farther end of screen F, and over it, into a receptacle or trough D' by which it is conveyed to the place of its intended use.

During the progress of the pulped material over the screen F all particles of ink, pigment, size, etc., are separated from the fibers of the pulp and also the pulp fibers are separated from each other. The particles of ink, pigment, size, etc., fall, or are driven by the water, falling upon the screen from sprinklers H, through the meshes of the screen F into trough C, whose bottom slopes in a direction opposite to that of the screen F. By this trough the impurities and a large proportion of the water flow through the opening $c$ into the tank D, where the impurities, removed from the pulp fibers, settle. The overflow $d$ from tank D carries away what coarse particles or impurities float on the water in the tank D, and the sediment is discharged, from time to time, through the bottom outlet $f$. The clarified water, remaining in the tank, may be used over again for the beating engines.

The treatment of the pulped material for the recovery of the pulp fibers by this process requires from three to five times its weight of water, but more than two-thirds of the water used may again be recovered for use in the beating engines. The quantity of cleaned pulp, recovered in this process is hardly any less in proportion to the quantity of the waste material pulped in the beater than what is obtained in the ordinary pulping process, and the costs of the process are only a small fraction over and above the costs of the ordinary pulping process of such materials. The pulp recovered by this process requires no bleaching, being as clean and white as it was originally, and while it is as suitable for manufacture of paper as fresh sulfite pulp, it is particularly suitable for manufacture of pulp boards for wat lining of chip and straw boards, and for manufacture of combination boards and of coated boards of all kinds.

I claim as my invention:—

1. The process of separating pulp fibers from pigments, size, filling and other impurities by passing the pulped material over a screen and subjecting it to the action of streams of water, directed thereon to move it over the screen.

2. The process of separating pulp fibers from pigments, size, filling and other impurities by passing the pulped material over a screen and subjecting it to the action of streams of water during its passage over the screen, substantially as herein set forth.

3. The process of recovering pulp from waste paper, newspapers, books and the like, consisting of the following steps: 1, pulping and waste papers; 2, soaking the pulped material in an alkaline solution and simultaneously subjecting it to the action of a mechanical agitator; 3, driving the pulped material over a coarse screen by streams of water acting thereon; 4, floating the material, passed through the coarse screen, onto a fine screen and 5, subjecting it to the action of streams of water, directed thereon to move it over the screen.

BISMARCK WILLIAM PETSCHE.

Witnesses:
Wm. Sherman,
Guy H. Pearson.